United States Patent [19]

Gillet

[11] Patent Number: 4,528,942

[45] Date of Patent: Jul. 16, 1985

[54] SET OF CAGES FOR ANIMALS

[76] Inventor: Roger G. Gillet, Route de la Noue Rousseau, Saint Michel sur Orge (Essonne), France

[21] Appl. No.: 599,834

[22] Filed: Apr. 13, 1984

[30] Foreign Application Priority Data

Apr. 14, 1983 [FR] France ................ 83 06139

[51] Int. Cl.³ .......................... A01K 5/00; A01K 1/00
[52] U.S. Cl. ........................................................ 119/18
[58] Field of Search .................... 119/17, 18, 22, 52 R

[56] References Cited

U.S. PATENT DOCUMENTS

| 529,230 | 11/1894 | Zimmerman | 119/18 X |
| 1,102,004 | 6/1914 | Conboie | 119/63 |
| 1,788,244 | 1/1931 | Larson | 119/52 R |
| 3,319,606 | 5/1967 | Virgil | 119/22 X |
| 3,727,582 | 4/1973 | Heying et al. | 119/18 |
| 4,036,177 | 7/1977 | DeSmit | 119/18 |
| 4,085,705 | 4/1978 | Gland et al. | 119/17 |

FOREIGN PATENT DOCUMENTS 2087998  7/1972  France .

*Primary Examiner*—Robert P. Swiatek
*Attorney, Agent, or Firm*—Seidel, Gonda & Goldhammer

[57] ABSTRACT (a) A set of cages for animals. (b) A set characterized in that it is subdivided into groups (4) of four cages (3) each comprising two adjacent cages of a row and two opposite cages in the other row, the central part of each group (4) of four cages having a food receiving hopper (5), the base of which discharges into a container (6) for food, each cage being formed with a lateral aperture (3₂) enabling the animals to reach the food in the container. (c) The invention applies to the construction of cages for animals, more particularly for rabbit breeding.

6 Claims, 5 Drawing Figures

SET OF CAGES FOR ANIMALS

This invention relates to a set of cages for animals, more particularly for rabbit breeding.

Sets of cages for rabbit breeding are already known in the form of two horizontal rows of opposite cages, each cage containing a rabbit.

Each such cage must have a nestbox and a food trough. The problem is to increase breeding yield, i.e. the number of cages, while retaining an adequate volume. These prior art cages have the nestbox and/or the food trough that are disposed outside the cage, apertures being formed in that case in the side wall of the cage to enable the animal to enter the nextbox and reach the food in the trough.

The cost of production of such installations is relatively high.

These known installations also require a considerable amount of time for the operations required for the care of the rabbit, particularly because of the food which has to be placed in each trough of each cage, thus making it difficult to use an automatic food discharge installation for such troughs.

In addition, rabbit food very quickly oxidizes in air and light, so that a small amount of food has to be placed in each trough and has to be replaced frequency.

The object of this invention is more particularly to obviate these disadvantages, and the invention therefore relates to a set of cages for animals in the form of two horizontal rows of opposite cages, characterised in that it is subdivided into groups of four cages each comprising two adjacent cages of a row and two opposite cages in the other row, the central part of each group of four cages having a food receiving hopper the base of which discharges into a container for said food, each cage being formed with a lateral aperture enabling the animal to reach the food in the container.

According to another feature of the invention, the hopper and its container are of square section and each cage of parallelepipedal shape has a cut-off corner fitting against one of the surfaces of the hopper and its container, the lateral aperture enabling the animal to reach the food in the container and being provided in each of the cut-off corners.

According to another feature of the invention, the cages are movable by sliding on section-members disposed transversely of the rows of the set.

The invention is illustrated by way of example without limiting force in the accompanying drawings wherein.

Figure 1:
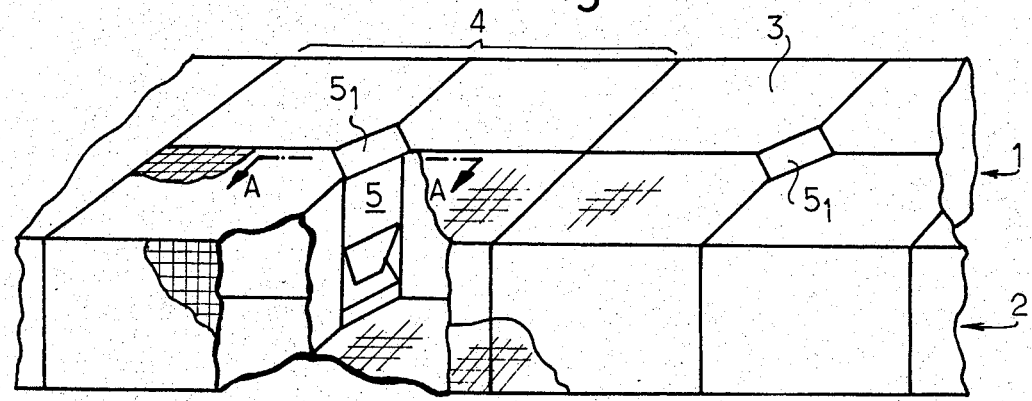
FIG. 1 is a diagrammatic perspective of a set of cages according to the invention.

The object of the invention is to provide a set of cages for animals, and more particularly for rabbit breeding, of lower production cost and enabling the yield, i.e. the number of cages per unit area, to be increased, and also reducing the expense involved in the necessary attention to the animals, while reducing the number of feeding points and thus enabling automatic feeding installations to be used.

The set of cages consists of two rows 1, 2 of cages 3 made of metal latticework or wire netting, the cages being arranged in opposite pairs.

The cages 3 of these rows are divided up into groups of four cages 4, which are provided with a single feed point in the form of a hopper 5 at the joint intersection of these four cages.

The upper open end $5_1$ of each hopper 5 is flush with the top surface of the cages 3 and the bottom narrowed-section end $5_2$, which is provided with a spout, is disposed above a container 6 into which the food flows progressively from the hopper 5 as it is eaten by the animals.

In the example illustrated, the hopper 5 and its container 6 are of square horizontal section and the hopper 5 is supported by its container 6 through the agency of uprights 7 connecting the corners of the hopper 5 to those of the container 6.

Each hopper and container assembly is disposed in the zone of intersection of the four cages of the group 4 so that each of its side surfaces $5_1$ is disposed at an angle in the corner of each of the cages 3, which are generally of rectangular parallelepipedal shape.

To this end, each cage 3 has a cut-off side edge $3_1$ which abuts the side face $5_1$ of the hopper and its container, said cut-off side $3_1$ of each cage 3 being formed with an aperture $3_2$ enabling the animal in each cage to reach the food in the container 6.

Partitions $5_3$ are provided at the corners of the set between the apertures $3_2$, more particularly to prevent the young rabbits from passing from one cage to another.

In the example illustrated (see FIG. 2), the container 6 is thus divided into four cells $6_1$ so that each of them can receive the food from the hopper 5 intended for the animal in the facing cage. The container 6 has an internal rim extending towards the base of the container 6.

It will be apparent that the construction of this set of cages gives just a single feeding point for four cages, the hoppers being readily refilled with food by an automatic installation, since the number of hoppers is reduced and they are disposed in alignment between the two rows 1 and 2.

Also as a result of this arrangement the volume occupied by this food trough is reduced and does not form a part going beyond the exterior of the perimeter of the rows of cages, so that the cage volume can be increased and a nest box 8 can be provided inside these cages.

The cages 3, which have a door either on the top surface or the side surface outside the rows. The cages 3 are disposed to be slidable to the exterior, transversely of each row, and to this end the cages 3 are supported by inverted T-sections 9 disposed transversely of the rows 1 and 2 of cages, the base of each of each cage being provided with flanges $3_3$ which are supported on flanges $9_1$ of the section-members 9, while the vertical limb $9_2$ of this section-member forms the guide means when the cages are slid.

The section members 9 are in turn secured to a longitudinal structure 10.

Figure 2:
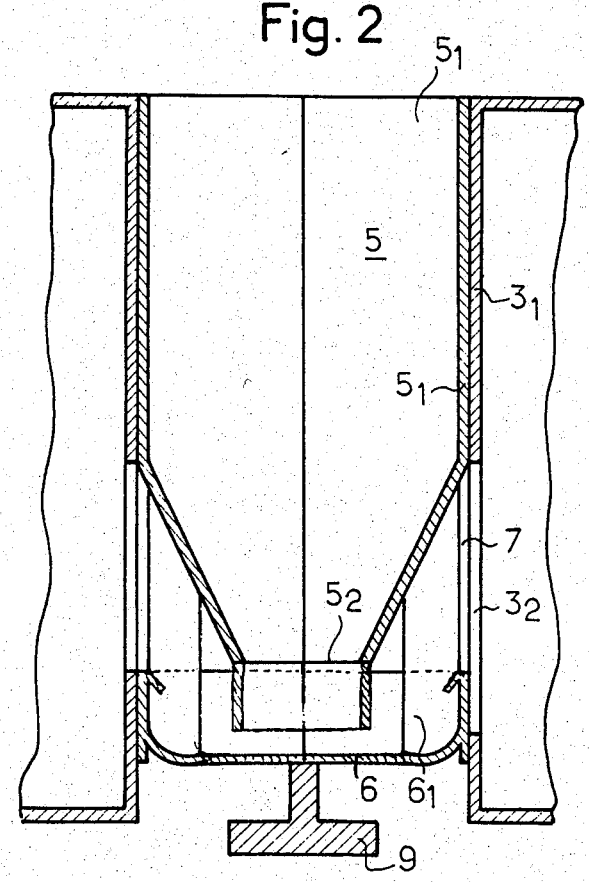
FIG. 2 is a section on the line A—A in FIG. 1.
Figure 3:
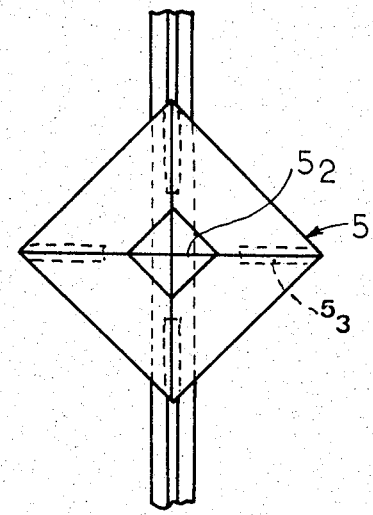
FIG. 3 is a top plan view of a hopper.
Figure 4:
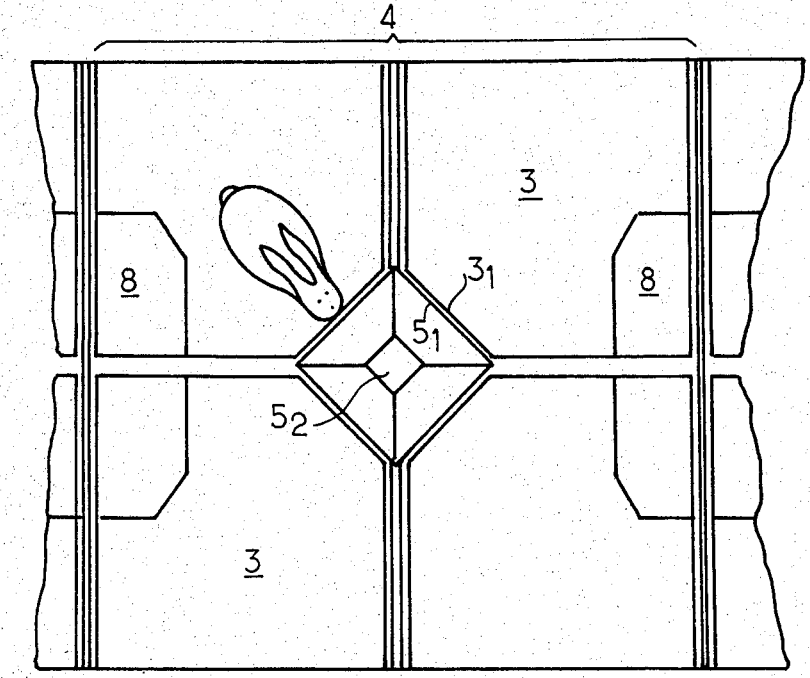
FIG. 4 is a partial top plan view in an enlarged scale of a set according to the invention.
Figure 5:
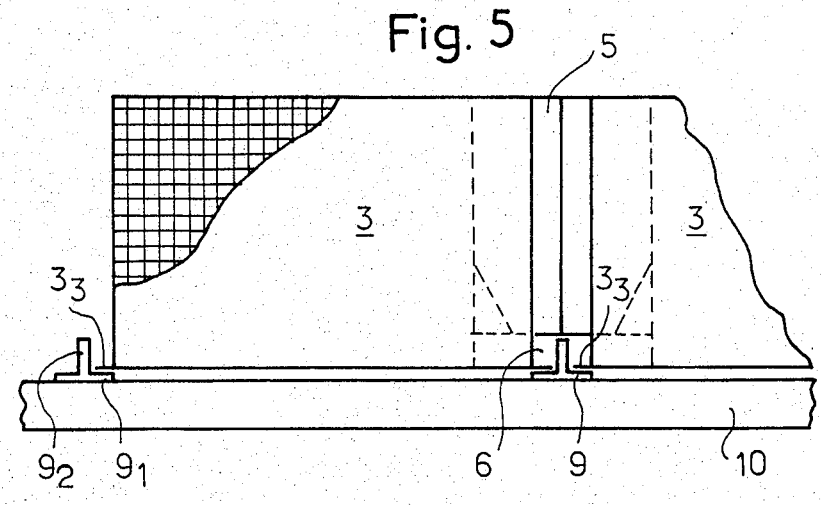
FIG. 5 is a partial side view of FIG. 4.

The section-members 9, which are disposed in the central zone of each group 4 of four cages, pass beneath the central zone of the containers 6 and form their support means, and the support means for the hoppers 5 (see FIG. 2).

I claim:

1. A set of cages for animals in the form of two horizontal rows of opposite cages, characterized in that the set is subdivided into groups of four cages, each cage is of parallelepipedal shape, each group comprising two adjacent cages in a row and two opposite cages in the other row, a central part of each group of four cages having a food receiving hopper and a container, which does not extend into the cages, said hopper having a narrowed-section bottom end, the bottom end of which discharges food into the container, each cage being formed with a cut-off corner fitting against a surface of the hopper and its container, a lateral aperture in said cut-off corner enabling the animal to reach the food in the container, said aperture being formed in each of said cut-off corners.

2. A set of cages according to claim 1, characterized in that the hopper and the container are of identical square horizontal sections and the hopper is supported by the container through uprights connecting the corners of the hopper to those of the containers.

3. A set of cages according to claim 1, characterized in that partitions are provided between the hopper and the container between the apertures in the cages.

4. A set of cages according to claim 3, characterized in that the partitions are spaced from the narrowed-section bottom end of the hopper.

5. A set of cages according to claim 1, characterized in that the container has an edge with internal rim extending towards the base of the container.

6. A set of cages according to claim 1, characterized in that the cages of each group are movable by sliding on section-members of T-shape disposed transversely to the rows of the set, said T-shaped section-members being inverted to receive on their flanges two adjacent cages of a row, the vertical limb of said T-shape section-members forming a guide means for the sliding operation.

* * * * *